United States Patent
Kotake

(10) Patent No.: US 9,645,716 B2
(45) Date of Patent: May 9, 2017

(54) DISPLAY PROCESSING APPARATUS FOR CONTROLLING DISPLAY, METHOD OF DISPLAY PROCESSING, AND NONTRANSITORY STORAGE MEDIUM STORING DISPLAY PROCESSING PROGRAM

(75) Inventor: Kanako Kotake, Toyokawa (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 439 days.

(21) Appl. No.: 13/434,624

(22) Filed: Mar. 29, 2012

(65) Prior Publication Data
US 2012/0317477 A1  Dec. 13, 2012

(30) Foreign Application Priority Data

Jun. 11, 2011  (JP) .................................. 2011-130746
Mar. 22, 2012  (JP) .................................. 2012-064933

(51) Int. Cl.
*G06F 3/0484*  (2013.01)
*G06F 3/0481*  (2013.01)
(Continued)

(52) U.S. Cl.
CPC ...... *G06F 3/04842* (2013.01); *G06F 3/04817* (2013.01); *G06F 17/30058* (2013.01); *G06F 17/30126* (2013.01); *G06F 21/36* (2013.01)

(58) Field of Classification Search
CPC .............. G06F 21/36; G06F 17/30058; G06F 17/30126; G06F 3/04842; G06F 3/04817
(Continued)

(56) References Cited

U.S. PATENT DOCUMENTS 5,812,128 A * 9/1998 Sterling, IV ........ G06F 3/04817
715/762
6,128,010 A * 10/2000 Baxter ...................... A45F 3/02
715/846
(Continued)

FOREIGN PATENT DOCUMENTS

JP  2004-310436 A  11/2004
JP  2007-51863 A  7/2007
(Continued)

OTHER PUBLICATIONS

Office Action issued in corresponding Japanese application No. 2012-064933, mailed Feb. 9, 2016.

*Primary Examiner* — Laurie Ries
*Assistant Examiner* — Brian Garmon
(74) *Attorney, Agent, or Firm* — Merchant & Gould P.C.

(57) ABSTRACT

A display processing apparatus comprises a controller configured to perform a first classification processing to classify a plurality of image files stored in a storage medium into a plurality of primary categories. The controller is further configured to perform a second classification processing to classify the plurality of image files into a plurality of secondary categories when it is judged that the number of the plurality of primary categories is greater than a maximum-displaying number. At least one of the plurality of secondary categories contains at least two of the plurality of primary categories. A plurality of primary-categorizing icons are displayed when the number of the plurality of secondary categories is equal to or less than the maximum-displaying number.

4 Claims, 11 Drawing Sheets

(51) Int. Cl.
  *G06F 21/36* (2013.01)
  *G06F 17/30* (2006.01)
(58) Field of Classification Search
  USPC .......................................................... 715/234
  See application file for complete search history.

(56) References Cited

U.S. PATENT DOCUMENTS

| | | | |
|---|---|---|---|
| 7,337,396 B2* | 2/2008 | Rosenholtz | G06F 3/0481 |
| | | | 707/999.005 |
| 2004/0001107 A1* | 1/2004 | Russon | G06F 17/30274 |
| | | | 715/838 |
| 2005/0091596 A1* | 4/2005 | Anthony et al. | 715/712 |
| 2005/0125736 A1* | 6/2005 | Ferri et al. | 715/747 |
| 2005/0240880 A1* | 10/2005 | Banks et al. | 715/836 |
| 2006/0274060 A1* | 12/2006 | Ni et al. | 345/419 |
| 2007/0189737 A1* | 8/2007 | Chaudhri | G06F 3/0482 |
| | | | 386/234 |
| 2007/0271524 A1* | 11/2007 | Chiu | G06F 3/0481 |
| | | | 715/767 |
| 2007/0296737 A1 | 12/2007 | Park et al. | |
| 2008/0092054 A1* | 4/2008 | Bhumkar | G06F 17/30899 |
| | | | 715/739 |
| 2010/0104146 A1* | 4/2010 | Momosaki | 382/118 |

FOREIGN PATENT DOCUMENTS

| | | |
|---|---|---|
| JP | 2007-317077 A | 12/2007 |
| JP | 2008-015698 A | 1/2008 |
| JP | 2008-085671 A | 4/2008 |

* cited by examiner

FIG.6

| CLASSIFICATION CONDITION | | FILE NAME | | | | | | | | | | | | | | |
|---|---|---|---|---|---|---|---|---|---|---|---|---|---|---|---|---|
| 2B | 2A | 1 | 2 | 3 | 4 | 5 | 6 | 7 | 8 | 9 | 10 | 11 | 12 | 13 | 14 |
| GROUP A | PERSON A | O | | O | | | | | | | | | | | |
| | PERSON B | O | O | | | | | | | | | | | | |
| | PERSON C | O | O | | | | | | | | | | | | |
| GROUP B | PERSON D | | | | O | | | | | | | | | | |
| | PERSON E | | | | O | O | | | | | | | | | |
| | PERSON F | | | | | O | O | | | | | | | | |
| GROUP C | PERSON G | | | | | | O | O | | | | | | | |
| | PERSON H | | | | | | | O | O | | | | | | |
| | PERSON I | | | | | | | O | O | | | | | | |
| GROUP D | PERSON J | | | | | | | | | O | | | | | |
| | PERSON K | | | | | | | | | O | O | O | | | |
| | PERSON L | | | | | | | | | O | O | O | | | |
| GROUP E | PERSON M | | | | | | | | | | | | O | | O |
| | PERSON N | | | | | | | | | | | | O | O | |

C2A: PERSON A–PERSON N column
C2B: GROUP A–GROUP E column

FIG.8

| DOMESTIC/OVERSEAS | REGION | PREFECTURE/COUNTRY | LOCATION INFORMATION |
|---|---|---|---|
| DOMESTIC | HOKKAIDO | HOKKAIDO | NORTH LATITUDE×x° ~××° |
| | TOHOKU | AOMORI | NORTH LATITUDE×x° ~××° |
| | | AKITA | NORTH LATITUDE×x° ~××° |
| | | ⋮ | ⋮ |
| | ⋮ | ⋮ | ⋮ |
| | TOKAI | SIZUOKA | NORTH LATITUDE×x° ~××° |
| | | AICHI | NORTH LATITUDE×x° ~××° |
| | | GIFU | NORTH LATITUDE×x° ~××° |
| | ⋮ | ⋮ | ⋮ |
| OVERSEAS | EUROPE | ITALY | NORTH LATITUDE×x° ~××° |
| | | FRANCE | NORTH LATITUDE×x° ~××° |
| | | SPAIN | NORTH LATITUDE×x° ~××° |
| | | ⋮ | ⋮ |
| | ⋮ | ⋮ | ⋮ |
| | ASIA | SOUTH KOREA | NORTH LATITUDE×x° ~××° |
| | | CHINA | NORTH LATITUDE×x° ~××° |
| | ⋮ | ⋮ | ⋮ |

FIG.9

| CLASSIFICATION CONDITION | | | FILE NAME | | | | | | | | | | | | | | | | |
|---|---|---|---|---|---|---|---|---|---|---|---|---|---|---|---|---|---|---|---|
| 3C | 3B | 3A | 1 | 2 | 3 | 4 | 5 | 6 | 7 | 8 | 9 | 10 | 11 | 12 | 13 | 14 | 15 | 16 | 17 |
| DOMESTIC | HOKKAIDO | HOKKAIDO | ○ | | | | | | | | | | | | | | | | |
| | TOHOKU | AOMORI | | ○ | | | | | | | | | | | | | | | |
| | | AKITA | | | ○ | | | | | | | | | | | | | | |
| | | SIZUOKA | | | | ○ | | | | | | | | | | | | | |
| | TOKAI | AICHI | | | | | ○ | | | | | | | | | | | | |
| | | GIFU | | | | | | ○ | | | | | | | | | | | |
| OVERSEAS | EUROPE | ITALY | | | | | | | ○ | | | | | | | | | | |
| | | FRANCE | | | | | | | | ○ | | | | | | | | | |
| | ASIA | | | | | | | | | | ○ | | | | | | | | |
| | | | | | | | | | | | | ○ | | | | | | | |
| | | | | | | | | | | | | | ○ | | | | | | |
| | | | | | | | | | | | | | | ○ | | | | | |
| | | | | | | | | | | | | | | | ○ | | | | |
| | | | | | | | | | | | | | | | | ○ | | | |
| | | SOUTH KOREA | | | | | | | | | | | | | | | ○ | | |
| | | | | | | | | | | | | | | | | | | ○ | |
| | | | | | | | | | | | | | | | | | | | ○ |

{ C3A  
{ C3B  
{ C3C

DISPLAY PROCESSING APPARATUS FOR CONTROLLING DISPLAY, METHOD OF DISPLAY PROCESSING, AND NONTRANSITORY STORAGE MEDIUM STORING DISPLAY PROCESSING PROGRAM

CROSS REFERENCE TO RELATED APPLICATION

The present application claims priority from Japanese Patent Application Nos. 2011-130746 filed on Jun. 11, 2011, and 2012-64933 filed on Mar. 22, 2012, the disclosures of which are herein incorporated by reference in their entireties.

BACKGROUND OF THE INVENTION

Field of the Invention

The present invention relates to a display processor, a method of a display processing to be executed in the display processor, and a nontransitory storage medium storing a program to be executed by a computer of the display processor.

Description of the Related Art

There is conventionally known a technique for displaying images. A display system is known as one technique. In this display system, a window screen is split into a plurality of areas according to the number of image files or folders to be displayed. Displayed on each split area is a thumbnail image representative of the image file or a frame representative of the folder. Further, a mark for displaying remaining thumbnail images not displayed is displayed, or a mark for displaying frames representative of remaining folders not displayed is displayed. When a user selects the mark, the displayed thumbnail images are scrolled, and other thumbnail images are displayed, or the displayed frames of the folders are scrolled, and other frames of folders are displayed.

An image display device is known as another technique. This image display device obtains an image or images, calculates the number of the images, creates an index image containing all the obtained images, and displays the index image on a display. The index image includes split areas whose number is greater than the calculated number of the images, and the number of the split areas increases as the number of the images increases. A size of each of the obtained images is reduced to a size of the split area, and each image is disposed on a corresponding one of the split areas.

SUMMARY OF THE INVENTION

In some techniques, an operation screen containing a plurality of icons is displayed on a display. If a display size of each icon on the operation screen is too small, it may be difficult for a user to recognize each icon. In this case, it is difficult that all the icons are contained in one operation screen in a state in which each icon is visually recognizable by the user. In order to solve this problem, there may be employed a configuration in which an operation screen containing icons not displayable is provided separately, and when the user has performed a predetermined operation such as display scroll and display switch, the another operation screen containing the icons not displayable is displayed on the display. However, in order to display another operation screen on the display, the user has to perform the predetermined operation.

This invention has been developed to provide a display processor, a method of a display processing to be executed in the display processor, and a nontransitory storage medium storing a program to be executed by a computer of the display processor, which are capable of displaying an operation screen on which a plurality of icons are arranged, in a state in which the icons can be easily recognized by a user.

The present invention provides a display processor for controlling a display to display thereon an operation screen on which a plurality of icons are arranged, the display processor including: a classifier configured to classify a plurality of image files stored in a storage medium accessible by the display processor, into a plurality of categories whose number is equal to or less than a reference number that is the number of icons arrangeable on the operation screen and that is determined based on a size of the operation screen; and a display controller configured to control the display to display thereon the operation screen on which are arranged a plurality of icons respectively representing the plurality of categories whose number is equal to or less than the reference number.

The present invention also provides a method of a display processing to be executed in a display processor for controlling a display to display thereon an operation screen on which a plurality of icons are arranged, the method comprising: classifying a plurality of image files stored in a storage medium accessible by the display processor, into a plurality of categories whose number is equal to or less than a reference number that is the number of icons arrangeable on the operation screen and that is determined based on a size of the operation screen; and controlling the display to display thereon the operation screen on which are arranged a plurality of icons respectively representing the plurality of categories whose number is equal to or less than the reference number.

The present invention also provides a nontransitory storage medium storing a program to be executed by a computer of a display processor for controlling a display to display thereon an operation screen on which a plurality of icons are arranged, the program being designed to have the computer function as: a classifier configured to classify a plurality of image files stored in a storage medium accessible by the display processor, into a plurality of categories whose number is equal to or less than a reference number that is the number of icons arrangeable on the operation screen and that is determined based on a size of the operation screen; and a display controller configured to control the display to display thereon the operation screen on which are arranged a plurality of icons respectively representing the plurality of categories whose number is equal to or less than the reference number.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 6 is a view for explaining a classification processing where the display criterion is a person;

FIG. 8 is a view showing one example of a location information list;

FIG. 9 is a view for explaining a classification processing where the display criterion is a location;

DETAILED DESCRIPTION OF THE EMBODIMENT

Hereinafter, there will be described one embodiment of the present invention by reference to the drawings. It is to be understood that the following embodiment is described only by way of example, and the invention may be otherwise embodied with various modifications without departing from the scope and spirit of the invention. For example, configurations described below may be partly omitted or replaced with other configurations. Other configurations may be added to the configurations described below.

<MFD>

There will be explained a multi-function device (MFD) as the present embodiment with reference to FIG. 1. The MFD 1 is a compact digital multi-function peripheral, for example. The MFD 1 has a printing function, a scanning function, a copying machine, and a direct printing function, for example. The direct printing function is a function in which image files stored in a storage medium 30 such as a USB memory or a memory card mounted in the MFD 1 are directly read out from the storage medium 30, and an image is printed on a recording medium such as a sheet based on one of the image files which has been selected by a user, for example. That is, in the direct printing function, the image file can be read out from the storage medium 30 mountable on the MFD 1 and printed. When the direct printing function is achieved, the MFD 1 executes a display processing (which will be described below) shown in FIGS. 3, 5, 7, and 10.

Figure 1:
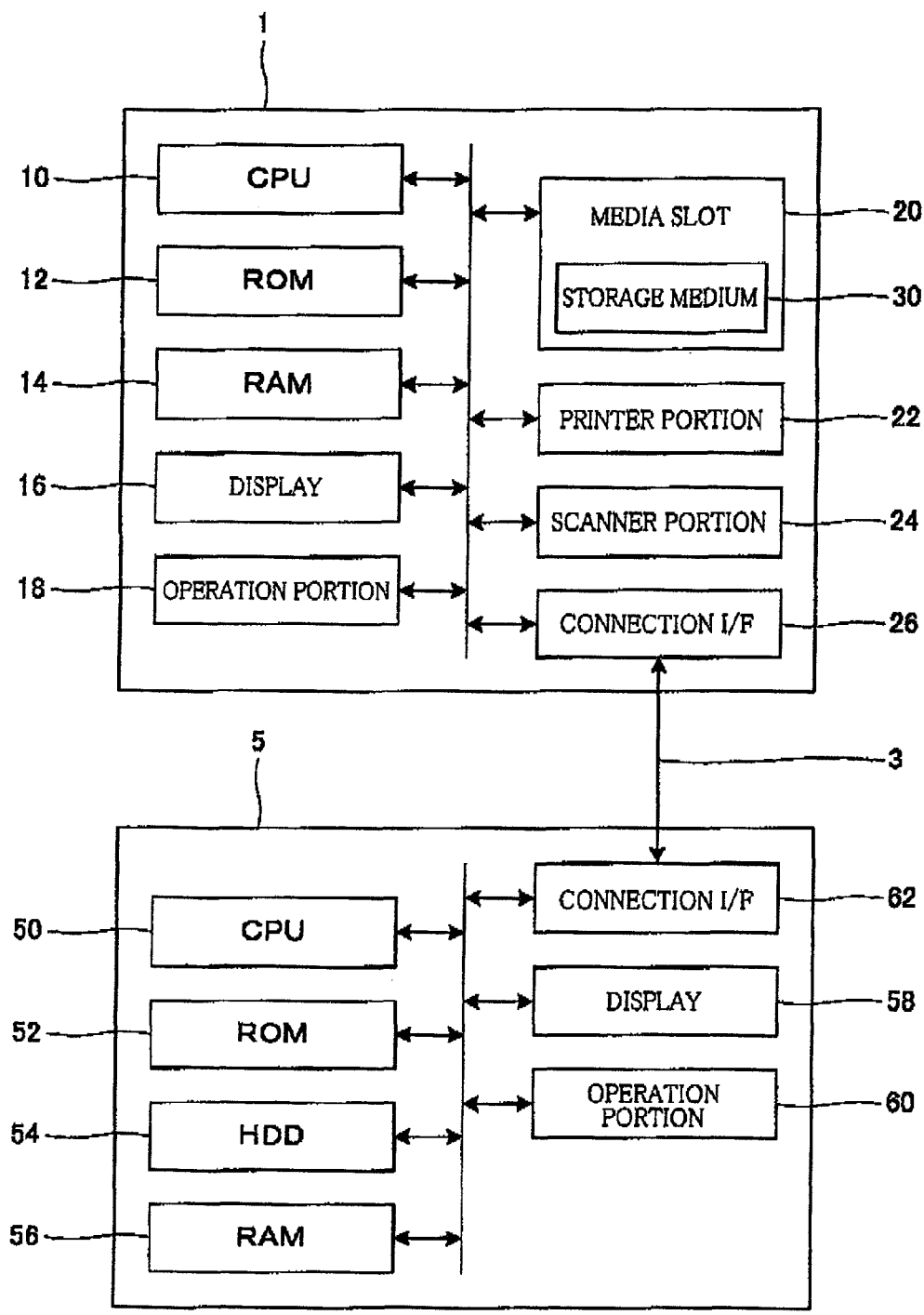
FIG. 1 is a block diagram showing general configurations of a multi-function device (MFD) and an information processing device communicable with the MFD each as one embodiment of the present invention.

As shown in FIG. 1, the MFD 1 includes a CPU 10, a ROM 12, a RAM 14, a display 16, an operation portion 18, a media slot 20, a printer portion 22, a scanner portion 24, and a connection interface (hereinafter referred to as "connection I/F") 26. The CPU 10 executes arithmetic processings. The ROM 12 stores therein computer programs for controlling the MFD 1, a location information list (which will be described below) shown in FIG. 8, and other data.

The computer programs stored in the ROM 12 include a computer program for the display processing. The RAM 14 has a storage area used when the CPU 10 executes the computer program(s) stored in the ROM 12. The CPU 10 controls the MFD 1 by executing a predetermined computer program stored in the ROM 12, for example. The CPU 10 functions as various functional sections for the display processing by executing the computer program for the display processing on the RAM 14, for example.

The display 16 displays various information thereon. For example, the display 16 displays an operation screen containing a plurality of icons. Here, each of the icons is any of an images, characters, and a mark and sign. For example, the icon includes a thumbnail representing contents of the image file stored in the storage medium or a method for creating the image file. Further, the icon includes the images, the characters, and marks representing a storage area (a folder or a directory) that is created for classifying and organizing image files to store them into the storage medium. The maximum number of the icons each having a reference display size and displayable on the operation screen at a time is a predetermined reference number corresponding to a size of a display area of the display 16, i.e., a size of the operation screen, for example. For example, where the size of the operation screen is a 3.7 type screen of 240×432 dots, three icons each having a reference display size of 94×94 dots or three icons each having a reference display size of 84×124 dots can be arranged on the operation screen (in these examples, the reference number is three). The reference number may be determined fixedly according to the size of the operation screen as thus described. Alternatively, where the size of the operation screen is variable, the number of the icons may be calculated based on the size of the operation screen to determine the reference number. In this embodiment, the reference number is five (fixed number). A specific example of the operation screen containing the icons will be described below. The operation portion 18 is constituted by a plurality of hardware keys and the touch-panel function, for example. The user operates the operation portion 18 to input various instructions into the MFD 1. The media slot 20 is a slot in which the storage medium 30 is to be mounted. The printer portion 22 is an ink-jet or laser printer device, for example. The printer portion 22 records or prints an image on the recording sheet or the like. The scanner portion 24 is a CIS or CCD scanner device. Image data created by the scanner portion 24 is stored in the storage medium 30 mounted in the media slot 20 or transmitted to an information processing device 5 as the image file, for example. The connection I/F 26 is an interface that connects between the MFD 1 and the information processing device 5 with a communication cable 3 for data communication therebetween.

<Information Processing Device>

There will be next explained the information processing device 5 with reference to FIG. 1. The information processing device 5 is a common personal computer. As shown in FIG. 1, the information processing device 5 includes components 50-62 (a CPU 50, a ROM 52, a HDD 54, a RAM 56, a display 58, an operation portion 60, and a connection I/F 62) that are the same as those of a common personal computer. Since the components 50-62 operate in the same manner as common components, an explanation of which is omitted.

<Display Processing>

Figure 2:
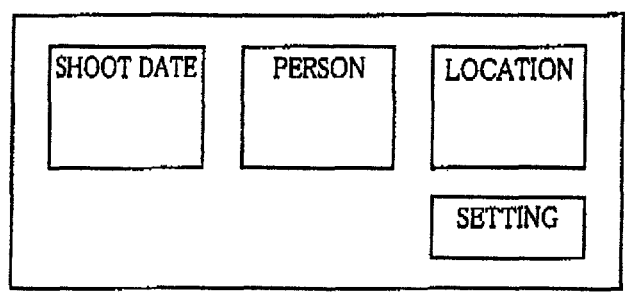
FIG. 2 is a view showing one example of a setting menu screen for setting a display criterion in the MFD.

There will be next explained the display processing of the MFD 1 with reference to FIGS. 2-11. FIG. 2 shows a setting menu screen for the user to set a display criterion before, the display processing is executed. This screen is a screen that is displayed on the display 16 when a button of the operation portion 18 is pressed for changing the MFD 1 from its standby state to a state for displaying the setting menu screen. This screen contains: three icons respectively representing three display criteria, namely, a shoot date (i.e., a date taken), a person, and a location; and one icon for setting a desired one of the display criteria. The user touches a desired one of the icons of the respective display criteria and then touches the icon for the setting by using the touch-panel function of the operation portion 18, whereby a command for executing a processing for setting the display criterion is inputted, and the desired display criterion is selected in this processing. The CPU 10 stores the selected display criterion into a predetermined storage area of the RAM 14 as a set value for the display processing. Upon boot-up of the MFD 1, the MFD 1 is in a state in which no display criteria are selected.

The display processing shown in FIGS. 3, 5, 7, and 10 is started when the user has operated the button of the operation portion 18 to input a command for executing the direct printing function in the state in which the storage medium 30 storing the image files is mounted in the media slot 20. The following description uses, as an example, a digital photograph taken or shot by a digital camera, a mobile terminal having a digital camera function, or the like, as an image to be displayed on the display 16 or an image file for an image to be printed by the printer portion 22. When the display processing is started, the CPU 10 in S100 compares the number of the icons to be displayed and arranged on the operation screen of the display 16 with the reference number. Specifically, the CPU 10 in S100 judges whether the number of the icons to be displayed and arranged on the operation screen of the display 16 is greater than the reference number ("the number of the icons>the reference number"). For example, it is assumed that the reference number is five (in the following explanation, the reference number is assumed to be five with, some exclusions). In this example, where five image files are stored in the storage medium 30, the icons arranged on the operation screen are five icons (thumbnails) respectively representing the five image files. The CPU 10 compares the number of the icons "5" with the reference number "5" and makes a negative decision in S100 (S100: No). Where twenty image files are stored in the storage medium 30, the icons arranged on the operation screen are twenty icons (thumbnails) respectively representing the twenty image files. Thus, the CPU 10 compares the number of the icons "20" with the reference number "5" and makes a positive decision in S100 (S100: Yes).

When the CPU 10 makes the negative decision in S100 (S100: No), the CPU 10 in S102 executes a processing for controlling the display 16 to display thereon the operation screen containing the icons respectively representing the image files. As a result, the operation screen containing these icons are displayed on the display 16. After S102, the CPU 10 finishes the display processing. In S102, the user checks the operation screen on the display 16 and then selects an desired image file(s) by touching one or ones of the icons which correspond to image file(s) to be printed by using the touch-panel function of the operation portion 18. The user then touches a print icon for commanding the print which is additionally contained in the operation screen (see "PRINT" in FIGS. 11A-11C). The CPU 10 opens the selected image files in a print area of the RAM 14 as files to be printed. The CPU 10 then controls the printer portion 22 to print the image files.

When the CPU 10 makes the positive decision in S100 (S100: Yes), the CPU 10 in S104 judges whether one of the display criteria has been set. In the present embodiment, the display criteria are the shoot date (in year, month, and day format), the person, and the location. Each display criterion serves as a corresponding one of classification conditions upon classifying the image files stored in the storage medium 30 and corresponds to a type of a corresponding one of the icons contained in the operation screen displayed on the display 16. In the display processing, the image files stored in the storage medium 30 are classified according to the classification condition corresponding to the display criterion, and the CPU 10 controls the display 16 to display thereon an operation screen containing icons respectively representing classified categories (see S400 in FIG. 10 which will be described below). When the CPU 10 judges that the display criterion has been set (S104: Yes), the CPU 10 in S106 judges whether the set display criterion is the shoot date (in year, month, and day format). When the CPU 10 judges that the display criterion has not been set (S104: No) or when the CPU 10 judges that the set display criterion is the shoot date (in year, month, and day format) (S106: Yes), the CPU 10 in S108 obtains shoot dates (in year, month, and day format) respectively from all the image files stored in the storage medium 30. Each image file contains the shoot date (in year, month, and day format) as header information.

Figure 4:
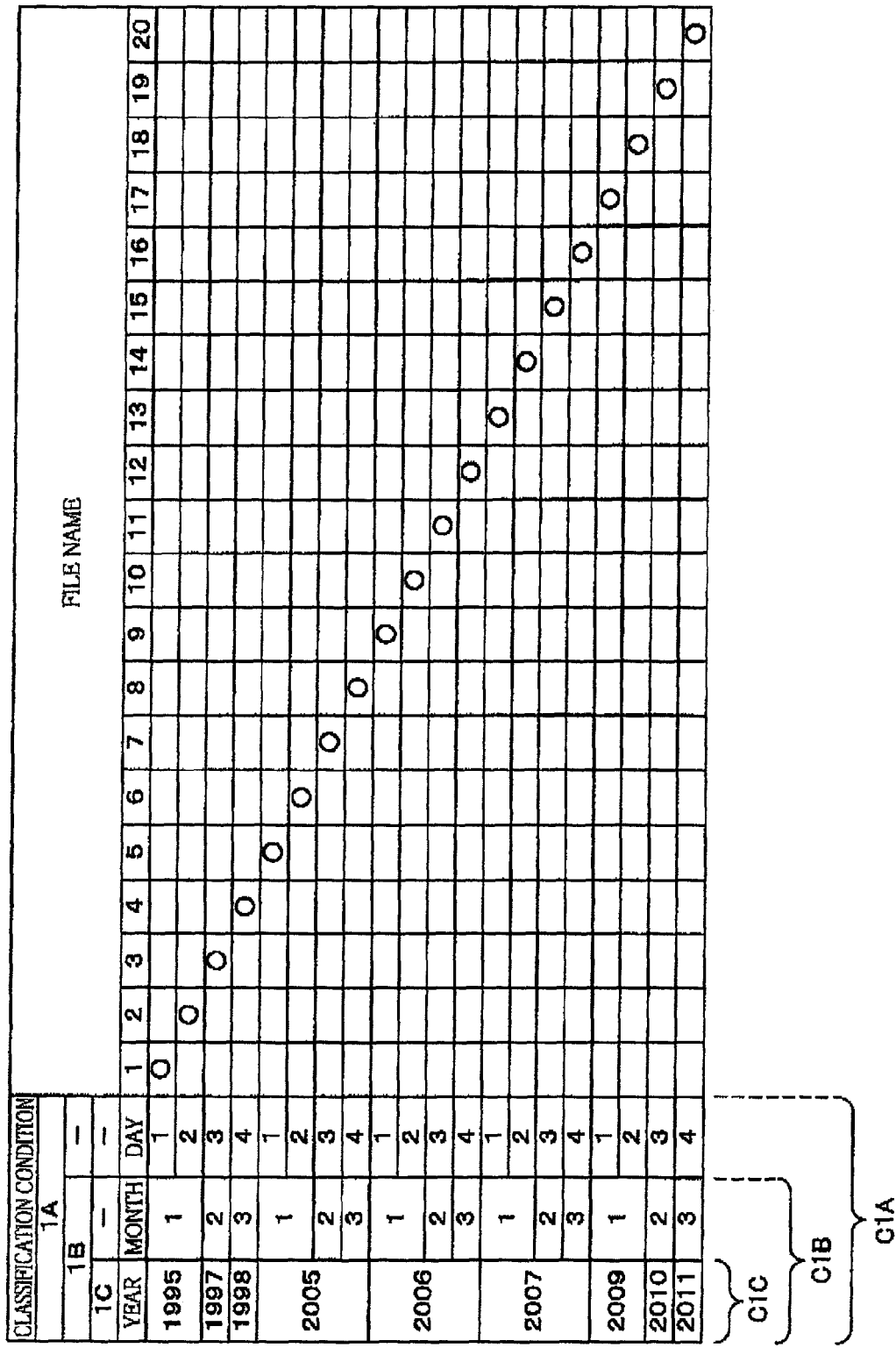
FIG. 4 is a view for explaining the classification processing where the display criterion is a shoot date (in year, month, and day format)

Then in S110, the CPU 10 classifies the image files each of whose shoot date (in year, month, and day format) has been obtained in S108 according to a classification condition 1A (shoot year, month, and day). The processing in S110 will be explained with reference to FIG. 4. It is assumed that twenty image files having their respective file names "1"-"20" are stored in the storage medium 30 shown in FIG. 4, and respective shoot dates (in year, month, and day format) of these twenty image files have been obtained in S108. In FIG. 4, a classification condition 1C (shoot year), a classification condition 1B (shoot year and month), and the classification condition 1A (shoot year, month, and day) correspond to the shoot date of the image file. For example, the image file whose file name is "1" is an image taken (shot) on Jan. 1, 1995 because its "YEAR" is "1995", its "MONTH" is "1", and its "DAY" is "1" (in FIG. 4). Though an explanation of the other image files are omitted, the twenty image files in FIG. 4 are images taken on different dates. Thus, in S110, the CPU 10 classifies the twenty image files respectively into twenty categories according to the shoot year, month, and day.

Then in S112, the CPU 10 compares, with the reference number, the number of categories C1A (the number of categories) into which the image files are classified according to the classification condition 1A (shoot year, month, and day). Specifically, the CPU 10 judges whether the number of the categories into which the image files are classified is greater than the reference number ("the number of the categories>the reference number"). When the image files shown in FIG. 4 are classified according to the shoot year, month, and day, the twenty image files are classified into the twenty categories. The CPU 10 compares the number of the categories "20" with the reference number "5" and judges that the number of the categories corresponding to the shoot year, month, and day is greater than the reference number (S112: Yes). In this case, the CPU 10 goes to S114. When the number of the categories corresponding to the shoot year, month, and day is equal to or less than the reference number (S112: No), the CPU 10 goes to S400 in FIG. 10.

Then in S114, the CPU 10 classifies the image files each of whose shoot date (in year, month, and day format) has been obtained in S108 according to the classification condition 1B (shoot year and month). The processing in S114 will be explained with reference to FIG. 4. The image file whose file name "1" is the image taken on Jan. 1, 1995. The image file whose file name "2" is an image taken on Jan. 2, 1995 because its "YEAR" is "1995", its "MONTH" is "1", and its "DAY" is "2". The classification condition 1B is the shoot year and month. The image files whose file names are "1" and "2" are the images taken in January 1995. Thus, the CPU 10 classifies the image files whose file names are "1" and "2" into a category corresponding to "January 1995". The image file whose file name is "3" is an image taken on Feb. 3, 1997 because its "YEAR" is "1997", its "MONTH" is "2", and its "DAY" is "3". The image file taken in February 1997 among the twenty image files is only the image file whose file name is "3". Thus, the CPU 10 classifies the image file whose file name is "3" singly into a category corresponding to "February 1997". Though not explained in detail, the CPU 10 classifies each of the image files whose file names are "4"-"20" into a corresponding one of the categories. As a result, the twenty image files are classified into fifteen categories.

Then in S116, the CPU 10 compares, with the reference number, the number of categories C1B into which the image files are classified according to the classification condition 1B (shoot year and month). The manner of the comparison in S116 is the same as that in S112. When the image files shown in FIG. 4 are classified according to the shoot year and month, the twenty image files are classified into the fifteen categories. The CPU 10 compares the number of the categories "15" with the reference number "5" and judges that the number of the categories corresponding to the shoot year and month is greater than the reference number (S116: Yes). In this case, the CPU 10 goes to S118. When the number of the categories corresponding to the shoot year and month, is equal to or less than the reference number (S116: No), the CPU 10 goes to S400 in FIG. 10.

Then in S118, the CPU 10 classifies the image files each of whose shoot date (in year, month, and day format) has been obtained in S108 according to the classification condition 1C (shoot year). The processing in S118 will be explained with reference to FIG. 4. The image files whose file names are "1" and "2" are the images respectively taken on Jan. 1, 1995 and Jan. 2, 1995. The classification condition 1C is the shoot year. The image files whose file names are "1" and "2" are taken in 1995. Thus, the CPU 10 classifies the image files whose file names are "1" and "2" into a category corresponding to "1995". The image file whose file name is "3" is the image taken on Feb. 3, 1997. The image file taken in 1997 among the twenty image files is only the image file whose file name is "3". Thus, the CPU 10 classifies the image file whose file name is "3" singly into a category corresponding to "1997". Though not explained in detail, the CPU 10 classifies each of the image files whose file names are "4"-"20" into a corresponding one of the categories. As a result, the twenty image files are classified into nine categories.

Then in S120, the CPU 10 compares, with the reference number, the number of categories C1C into which the image files are classified according to the classification condition 1C (shoot year). The manner of the comparison in S120 is the same as that in S112. When the image files shown in FIG. 4 are classified according to the shoot year, the twenty image files are classified into the nine categories. The CPU 10 compares the number of the categories "9" with the reference number "5" and judges that the number of the categories corresponding to the shoot year is greater than the reference number (S120: Yes). In this case, the CPU 10 goes to S122. When the number of the categories corresponding to the shoot year is equal to or less than the reference number (S120: No), the CPU 10 goes to S400 in FIG. 10.

In S122, the CPU 10 combines the categories each corresponding to the shoot year on a year basis such that the number of the categories becomes equal to or less than the reference number. According to the above-described processings in S118 and S120, since the number of the categories is "9", the number of the categories needs to be reduced by four in order for the number of the categories to become equal to or less than the reference number. For example, the CPU 10 in S122 divides the number of the categories "9" based on the shoot year by the reference number "5" and obtains "2" as the number of combined categories (noted that a fractional portion thereof is rounded up). The obtained number "2" means that two categories are combined to one category. Each two of the categories are combined based on the number of the combined categories "2" in ascending order of year. The CPU 10 combines the category corresponding to "1995" into which the image files whose file names are "1" and "2" are classified and the category corresponding to "1997" into which the image file whose file name is "3" is classified, with each other to create a category corresponding to "1995"-"1997". Likewise, the CPU 10 creates a category corresponding to "1998"-"2005", a category corresponding to "2006"-"2007", and a category corresponding to "2009"-"2010". A category corresponding to "2011" with which no categories are to be combined is not changed (left intact). As a result, the image files whose file names are "1"-"3" are classified into the category corresponding to "1995"-"1997". The image files whose file names are "4"-"8" are classified into the category corresponding to "1998"-"2005". The image files whose file names are "9"-"16" are classified into the category corresponding to "2006"-"2007". The image files whose file names are "17"-"19" are classified into the category corresponding to "2009"-"2010". The image file whose file name "20" is classified into the category corresponding to "2011" as in the processing in S118. As a result, the nine categories in S118 are changed to the five categories, and the twenty image files are classified into the five categories. After the execution in S122, the CPU 10 goes to S400 in FIG. 10. It is noted that each of the classification condition 1A (shoot year, month, and day) as one example of a first classification condition (criterion) and the classification condition 1B (shoot year and month) as one example of a second classification condition (criterion) is a classification condition in which the image files are classified based on the shoot dates of the image files. The classification condition 1A is a classification condition in which the shoot date of the image file is a specific day (as one example of a first length of time) that is specified by year, month, and day. The classification condition 1B is a classification condition in which the shoot date of the image file is within a specific month (as one example of a second length of time) specified by a year and month including the specific day and a period other than the specific day.

Returning to S106, when the CPU 10 judges that the set display criterion is not the shoot date (in year, month, and day format) (S106: No), the CPU 10 goes to S200 in FIG. 5. In S200, the CPU 10 judges whether the set display criterion is the person. When the CPU 10 judges that the set display criterion is the person (S200: Yes), the CPU 10 in S202 performs image analyses of all the image files stored in the storage medium 30 for facial recognition. The image analyses for the facial recognition are performed by a practically usable method. The CPU 10 identifies a person contained (taken) in the image file. Then in S204, the CPU 10 classifies the image files for which the image analyses are performed in S202, according to a classification condition 2A (person). The processing in S204 will be explained with reference to FIG. 6. It is assumed that the storage medium 30 stores therein fourteen image files whose file names are "1"-"14" as shown in FIG. 6. In the image analyses in S202, the CPU 10 identifies three persons: a person A, a person B, and a person C from the image file whose file name is "1" (see persons with sign "○" in a column of the file name "1" in FIG. 6). Though the other image files are not explained, the CPU 10 in S202 identifies fourteen persons (persons A-N) from fourteen image files in the example shown in FIG. 6. Thus, in S204, the CPU 10 classifies the fourteen image files into fourteen categories respectively for the fourteen persons. For example, the image file whose file name is "1" is classified into three categories: the category corresponding to the person A, the category corresponding to the person B, and the category corresponding to the person C.

Then in S206, the CPU 10 compares, with the reference number, the number of categories C2A into which the image files are classified according to the classification condition 2A (person). The manner of the comparison in S120 is the same as that in S112 in FIG. 3. The manner of the comparison in S206 is the same as that in S112. When the image files shown in FIG. 6 are classified according to their persons, the fourteen image files are classified into the fourteen categories. The CPU 10 compares the number of the categories "14" with, the reference number "5" and judges that the number of the categories respectively corresponding to the persons is greater than the reference number (S206: Yes). In this case, the CPU 10 goes to S208. When the CPU 10 judges that the number of the categories respectively corresponding to the persons is equal to or less than the reference number (S206: No), the CPU 10 goes to S400 in FIG. 10.

In S208, the CPU 10 classifies the image files according to the classification condition 2B (a group including a plurality of persons). The CPU 10 in S208 uses a result of the classification in S204. The processing in S208 will be explained with reference to FIG. 6. The CPU 10 first executes a processing for the person A and specifies two image files whose file names are "1" and "3" as image files containing the person A. In the present embodiment, the CPU 10 determines the person A, as the person to be processed, who is contained in the image file whose file name is "1" as a first image file among the persons A, B, and C, for example. The CPU 10 then specifies the persons A, B, and C and the persons A and C respectively in the image files whose file names are "1" and "3". The image file whose file name "1" contains the persons A, B, and C. The image file whose file name is "3" contains the persons A and C. The CPU 10 then extracts the persons A, B, and C as persons to be contained in the same group. The CPU 10 then executes the processing for the person B and specifies the image files whose file names are "1" and "2" as the image files containing the person B. The CPU 10 newly specifies the persons B and C in the image file whose file name is "2". The image file whose file name "2" contains the persons B and C who have already been extracted. The CPU 10 then executes the processing for the person C and specifies three image files whose file names are "1"-"3" as the image files containing the person C. The image files whose file names are "1"-"3" are the image files having already been specified by the CPU 10. The image fides other than the image files whose file names are "1"-"3" do not contain any of the persons A, B, and C. When the CPU 10 has found that persons other than the persons A, B, and C are not contained in the image files whose file names are "1"-"3", the CPU 10 classifies image files each containing at least one of the persons A, B, and C extracted as the persons to be contained in the same group, i.e., the image files whose file names are "1"-"3" into a category corresponding to one group (group A). As thus described, the CPU 10 executes the processing for the persons extracted as the persons to be contained in the same group. That is, the CPU 10 classifies all the image files each containing at least one person to be processed. Where one image file contains a plurality of persons, the persons to be contained in the same group are extracted such that the persons are included in the group.

Further, the CPU 10 then executes the processing for, e.g., the person D as one of persons not included in the group A and specifies image files containing the person D. The CPU 10 specifies the image files whose file names are "4" and "6". The image file whose file name "4" contains the persons D and E, and the image file whose file name is "6" contains the persons D and F. Thus, the CPU 10 extracts the persons D, E, and F as the persons to be contained in the same group. The CPU 10 then executes the processing for the person E and specifies the image files whose file names are "4" and "5" as the image files containing the person E. The CPU 10 newly specifies the image file whose file name is "5". The image file whose file name "5" contains the persons E and F having already been extracted. The CPU 10 then executes the processing for the person F and specifies the image files whose file names are "5" and "6" as the image files containing the person F. The image files whose file names are "5" and "6" are the image files having already been specified by the CPU 10. The image files other than the image files whose file names are "4"-"6" do not contain any of the persons D, E, and F. When the CPU 10 has found that persons other than the persons D, E, and F are not contained in the image files whose file names are "4"-"6", the CPU 10 classifies image files each containing at least one of the persons D, E, and F extracted as the persons to be contained in the same group, i.e., the image files whose file names are "4"-"6" into a category corresponding to one group (group B). Though not explained in detail, the CPU 10 executes the processing sequentially for persons having not been processed and classifies each of the image files whose file names are "7"-"14" into a corresponding one of the categories. As a result, the fourteen image files are classified into five categories respectively corresponding to the groups A-E.

Then in S210, the CPU 10 compares, with the reference number, the number of categories C2B corresponding to the groups each including the persons into which the image files are classified according to the classification condition 2B. The manner of the comparison in S210 is the same as that in S112. When the image files shown in FIG. 6 are classified according to their group, the fourteen image files are classified into the five categories. The CPU 10 compares the number of the categories "5" with the reference number "5" and judges that the number of the categories C2B corresponding to the groups including the persons is equal to or less than the reference number (S210: No). In this case, the CPU 10 goes to S400 in FIG. 10. When the CPU 10 judges that the number of the categories C2B corresponding to groups including the persons is greater than the reference number (S210: Yes), the CPU 10 in S212 combines the categories each corresponding to the group including the persons on a group basis such that the number of the categories becomes equal to or less than the reference number. It is noted that each of the classification condition 2A (the person in the image file) as another example of the first classification condition (criterion) and the classification condition 2B (the group including the persons) as another example of the second classification condition (criterion) is a classification condition in which the image files are classified based on the person(s) in the image file. The classification condition 2A is a classification condition in which the person in the image file is a specific person (the first number of persons) identified as an individual. The classification condition, 2B is a classification condition in which the person in the image file is in a specific group (the second number of persons) specified by a group including the specific person and persons other than the specific person.

Returning to S200, when the CPU 10 judges that the set display criterion is not the person (S200: No), the set display criterion is the location. Thus, the CPU 10 goes to S300 in FIG. 7. In S300, the CPU 10 obtains GPS (Global Positioning System) information from all the image files stored in the storage medium 30. Each image file contains the GPS information as header information. The GPS information represents a location at which a photograph corresponding to the image file has been taken. Specifically, the (PS information represents a latitude and a longitude of the location, for example. For example, the latitude and the longitude are represented as XX degrees north latitude and YYY degrees east longitude (noted that "XX" is an angle representing the latitude, and "YYY" is an angle representing the longitude). Then in S302, the CPU 10 specifies the location of each image file ("DOMESTIC/OVERSEAS", "REGION", and "PREFECTURE/COUNTRY") based on the GPS information for each image file obtained in S300 and the location information list shown in FIG. 8. Where the image file is a digital photograph, the location of the image file is a shoot location. The processing in S302 will be explained in detail with reference to FIGS. 8 and 9. It is assumed that the storage medium 30 stores therein seventeen image files whose file names are "1"-"17" shown in FIG. 9. The CPU 10 initially executes the processing for the image file whose file name is "1" and specifies its location based on the GPS information of the image file obtained in S300. The location information list is referred for the specification of the location. The location information list is a list in which each prefecture is associated with location information of each prefecture for "DOMESTIC", and each country is associated with location information of each country for "OVERSEAS". In the location information list, each prefecture in "DOMESTIC" is classified into a region to which the prefecture belongs, each country in "OVERSEAS" is classified into a region to which the country belongs.

For example, where the image file whose file name is "1" is taken in Hokkaido, the CPU 10 obtains in S300 GPS information indicating a predetermined position in Hokkaido for the image file whose file name is "1". The CPU 10 accesses the location information list to specify the location including the position indicated by this GPS information. In this case, the CPU 10 specifies "DOMESTIC, HOKKAIDO, HOKKAIDO" as its location. For the other image files, the CPU 10 specifies "DOMESTIC, TOHOKU, AOMORI" for the image file whose file name is "2", "DOMESTIC, TOHOKU, AKITA" for the image file whose file name is "3", "DOMESTIC, TOKAI, SIZUOKA" for the image file whose file name is "4", "DOMESTIC, TOKAI, AICHI" for the image file whose file name is "5", and "DOMESTIC, TOKAI, GIFU" for the image file whose file name is "6". The CPU 10 specifies "OVERSEAS, EUROPE, ITALY" for the image files whose file names are "7" and "8", "OVERSEAS, EUROPE, FRANCE" for the image files whose file names are "9"-"11", and "OVERSEAS, ASIA, SOUTH KOREA" for the image files whose file names are "12"-"17".

After S302, the CPU 10 in S304 classifies the image files whose respective locations have been specified in S302 according to a classification condition 3A (the domestic prefectures and the overseas countries). The processing in S304 will be explained with reference to FIG. 9. The location has been already specified in S302 for each of the image files whose file names are "1"-"17". The CPU 10 classifies each of the image files whose file names are "1"-"17" according to the corresponding location having already been specified. For example, the CPU 10 classifies the image file whose file name is "1" and whose location is "DOMESTIC, HOKKAIDO, HOKKAIDO" into a category corresponding to "HOKKAIDO". Likewise, the CPU 10 classifies the image files whose file names are "12"-"17" and whose location is "OVERSEAS, ASIA, SOUTH KOREA" into a category corresponding to "SOUTH KOREA". Though an explanation is omitted, the CPU 10 classifies each of the image files whose file names are "2"-"11" into a corresponding one of categories. As a result, the seventeen image files are classified into the nine categories according to the classification condition 3A.

Then in S306, the CPU 10 compares, with the reference number, the number of categories C3A corresponding to the domestic prefectures and the overseas countries into which the image files are classified according to the classification condition 3A. The manner of the comparison in S306 is the same as that in S112. When the image files shown in FIG. 9 are classified according to the domestic prefectures and the overseas countries, the seventeen image files are classified into the nine categories. The CPU 10 compares the number of the categories "9" with the reference number "5" and judges that the number of the categories C3A respectively corresponding to the prefectures or the countries is greater than the reference number (S306: Yes). In this case, the CPU 10 goes to S308. When the CPU 10 judges that the number of the categories C3A respectively corresponding to the prefectures or the countries is equal to or less than the reference number (S306: No), the CPU 10 goes to S400 in FIG. 10.

The CPU 10 in S308 classifies the image files whose respective locations have been specified in S302 according to a classification condition 3B (domestic regions and overseas regions). The processing in S308 will be explained in detail with reference to FIG. 9. The CPU 10 classifies the image files whose file names are "1"-"17" according to their respective locations specified in S302. For example, the CPU 10 classifies the image file whose file name is "5" and whose location is "DOMESTIC, TOKAI, AICHI" into a category corresponding to "TOKAI". Likewise, the CPU 10 classifies the image files whose file names are "12"-"17" and whose location is "OVERSEAS, ASIA, SOUTH KOREA" into a category corresponding to "ASIA". Though an explanation is omitted, the CPU 10 classifies each of the image files whose file names are "1", "2"-"3", "4"-"6", and "7"-"11" into a corresponding one of the categories. As a result, the seventeen image files are classified into the five categories according to the classification condition 3B.

Then in S310, the CPU 10 compares, with, the reference number, the number of categories C3B corresponding to the domestic regions and the overseas regions into which the image files are classified according to the classification condition 3B. The manner of the comparison in S310 is the same as that in S112. When the image files shown in FIG. 9 are classified according to the domestic regions and the overseas regions, the seventeen image files are classified into the five categories. The CPU 10 compares the number of the categories "5" with the reference number "5" and judges that the number of the categories C3B respectively corresponding to the domestic regions and the overseas regions is equal to or less than the reference number (S310: No). In this case, the CPU 10 goes to S400 in FIG. 10. When the CPU 10 judges that the number of the categories C3B respectively corresponding to the domestic regions and the overseas regions is greater than the reference number (S310: Yes), the CPU 10 in S312 classifies the image files whose respective locations have been specified in S302 according to a classification condition 3C ("DOMESTIC/OVERSEAS").

Figure 3:
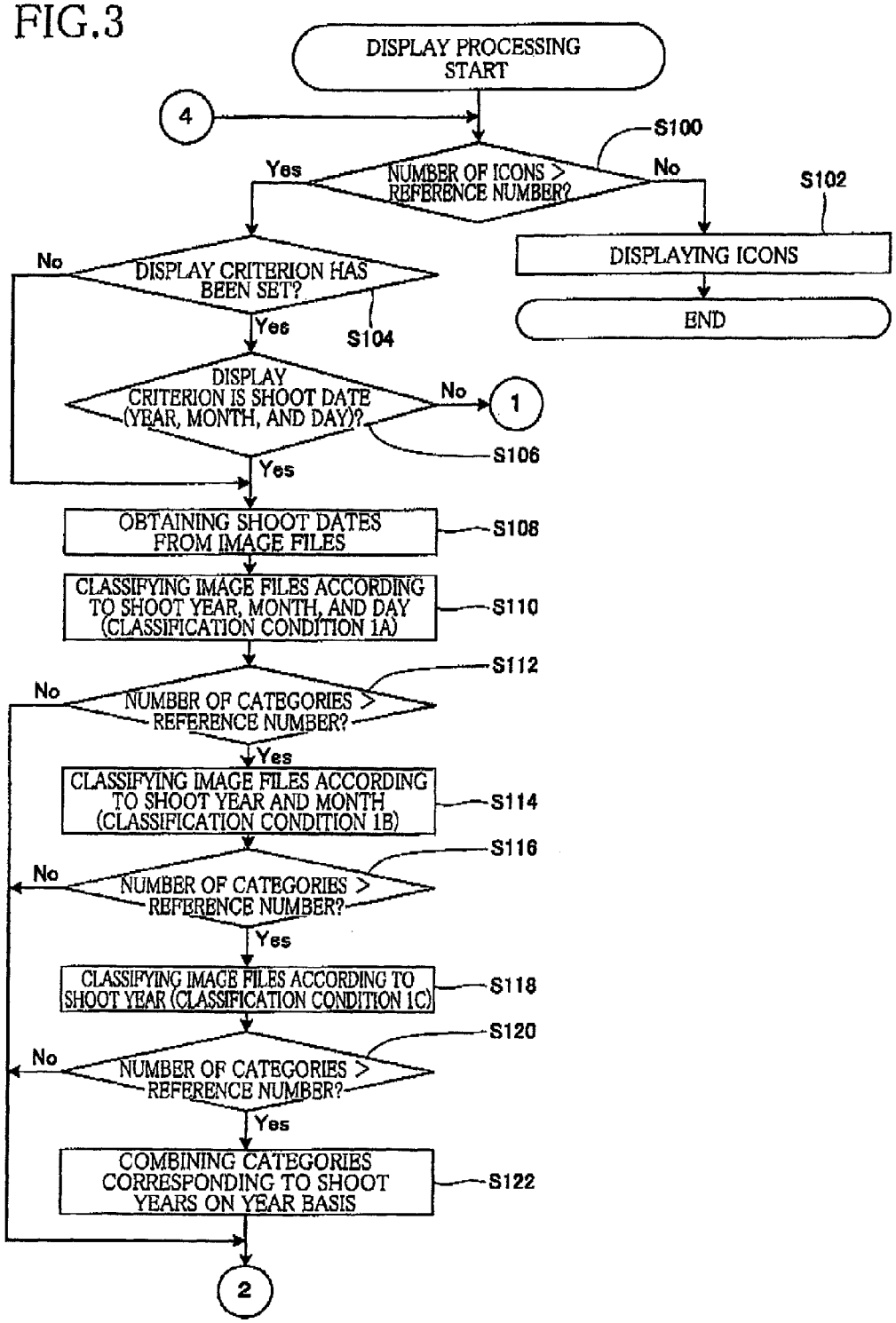
FIG. 3 is a flow-chart showing a first part of a display processing in the MFD.
Figure 5:
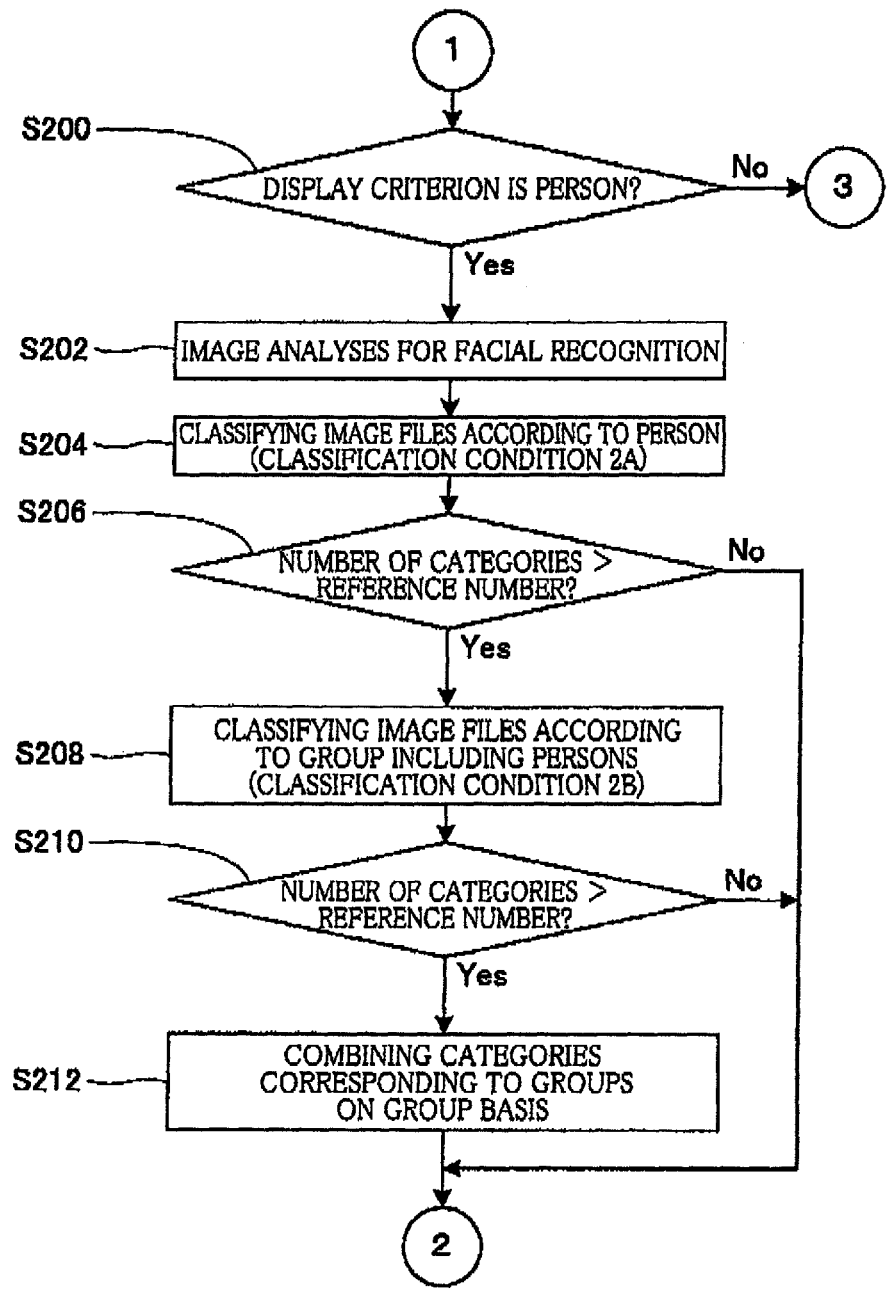
FIG. 5 is a flow-chart showing a second part of the display processing in the MFD which is continued from the first part.
Figure 7:
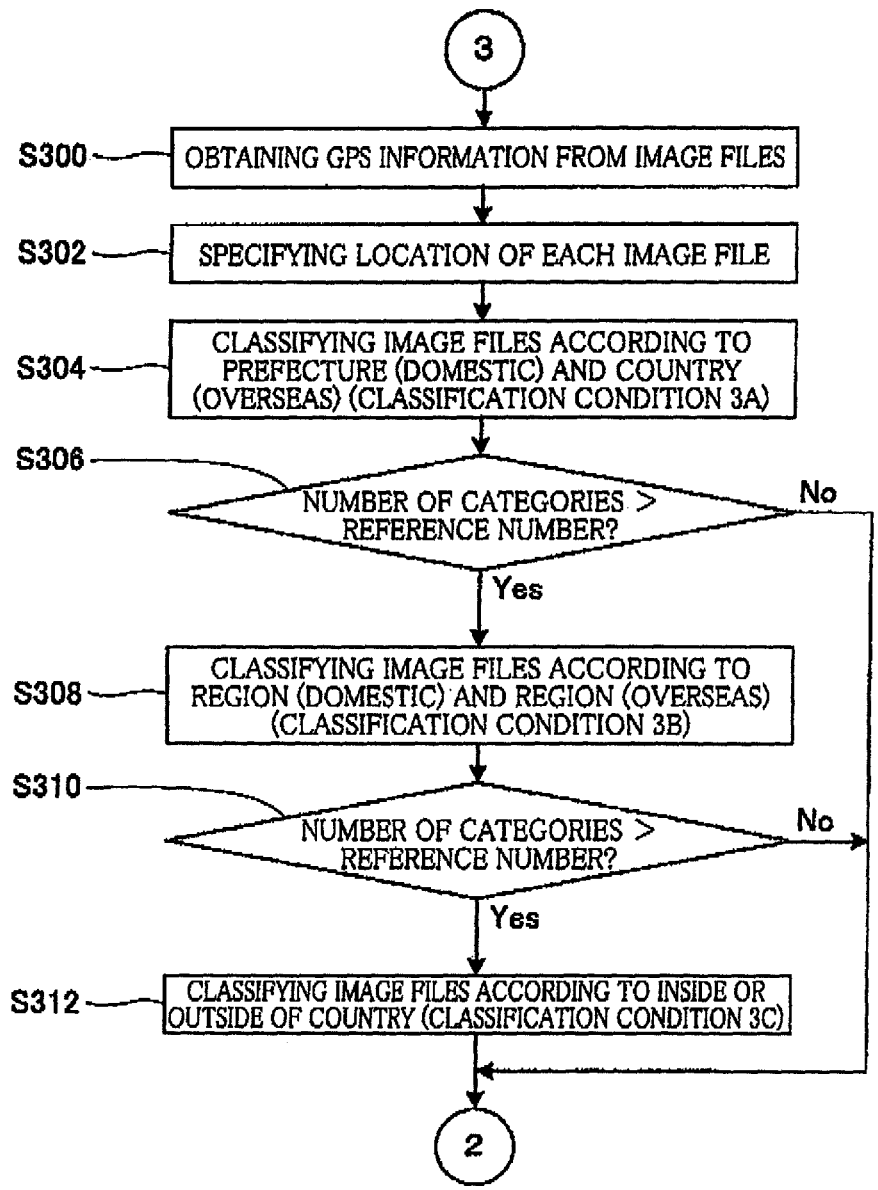
FIG. 7 is a flow-chart showing a third part of the display processing in the MFD which is continued from the second part.
Figure 10:
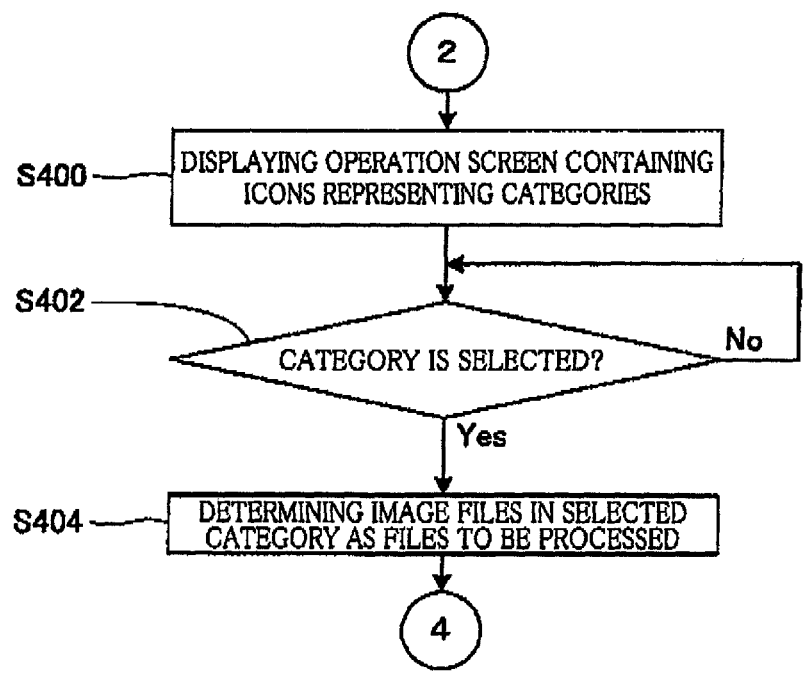
FIG. 10 is a flow-chart showing a fourth part of the display processing in the MFD which is continued from the third part.
Figure 11A:
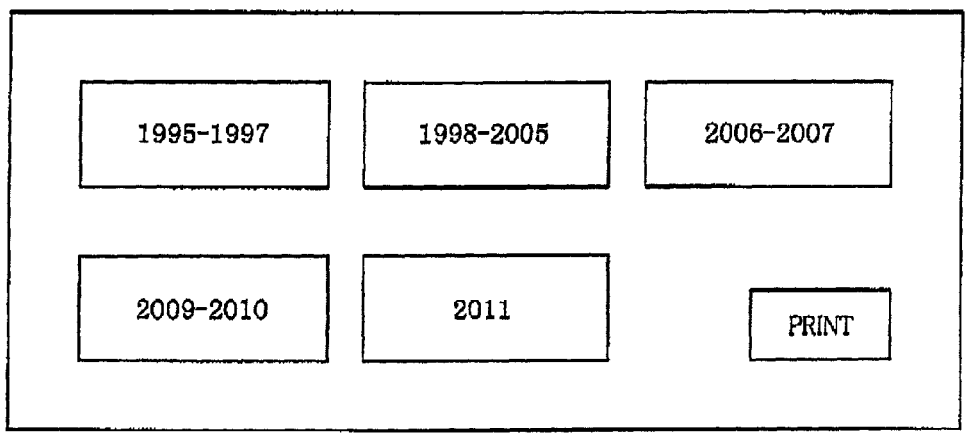
FIG. 11A is a view showing one example of an operation screen where the display criterion is the shoot date (in year, month, and day format)
Figure 11B:
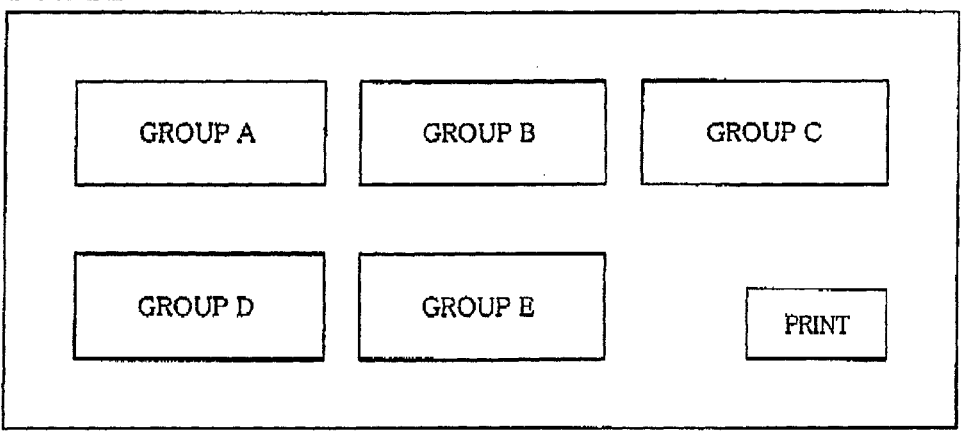
FIG. 11B is a view showing one example of an operation screen where the display criterion is the person.
Figure 11C:
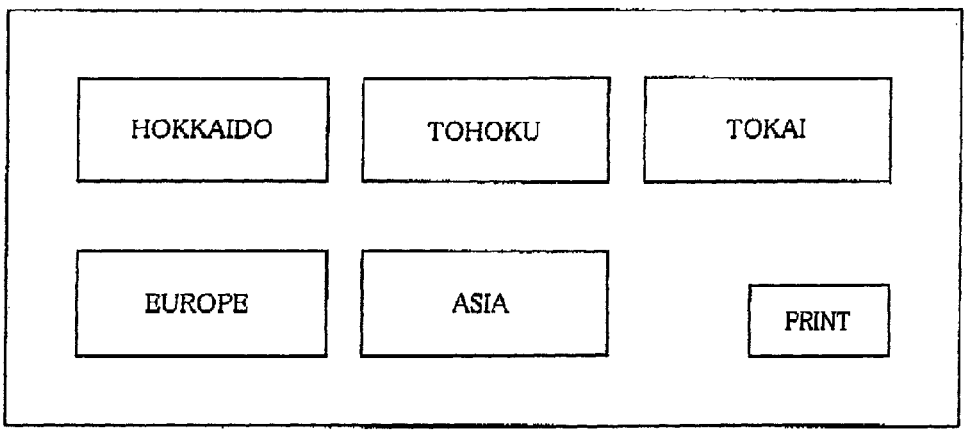
FIG. 11C is a view showing one example of an operation screen where the display criterion is the location.

In S400 in FIG. 10, the CPU 10 controls the display 16 to display thereon the operation screen containing the icons respectively representing the categories into which the image files are classified in one of the processings (S110, S114, S118, and S122 in FIG. 3, S204, S208, S212 in FIG. 5, end S304, S308, and S312 in FIG. 7). As a result, the operation screen containing the icons respectively representing the categories into which the image files are classified is displayed on the display 16. In each of the cases, the number of the icons contained in the operation screen is equal to or less than the reference number. For example, where the processing in S122 in FIG. 3 has been executed in the example shown in FIG. 4, the CPU 10 controls the display 16 to display thereon an operation screen shown in FIG. 11A. This operation screen contains five icons created by combining the categories on the year basis. Where the processing in S208 in FIG. 5 has been executed in the example shown in FIG. 6, the CPU 10 controls the display 16 to display thereon an operation screen shown in FIG. 11B. This operation screen contains five icons representing the categories corresponding to the respective groups. Where the processing in S308 in FIG. 7 has been executed in the example shown in FIG. 9, the CPU 10 controls the display 16 to display thereon an operation screen shown in FIG. 11C. This operation screen contains five icons representing the categories corresponding to the respective domestic regions and overseas regions. Each of the operation screens shown in FIGS. 11A-11C contains the print icon for commanding the print. It is noted that each of the classification condition 3A (the domestic prefecture and the overseas country as the shoot location of the image file) as another example of the first classification condition (criterion) and the classification condition 3B (the domestic region and the overseas region as the shoot location of the image file) as another example of the second classification condition (criterion) is a classification condition whose condition is the shoot location of the image file based on which the image files are classified. The classification condition 3A is a classification condition in which the shoot location of the image file is in a specific region (as one example of a first area) specified by the domestic prefecture or the overseas country. The classification condition 3B is a classification condition in which the shoot location of the image file is a region (as one example of a second area) specified by the domestic region or the overseas region including the specific region and a region other than the specific region.

Then in S402, the CPU 10 judges whether a specific category corresponding to one of the icons contained in the operation screen displayed on the display 16 has been selected. Upon the selection of the specific category, the user touches one of the five icons and then touches the print icon by using the touch-panel function of the operation portion 18, thereby selecting a category corresponding to the touched icon. When the CPU 10 judges that the specific category has not been selected (S402: No), the CPU 10 repeats this processing. When the CPU 10 judges that the specific category has been selected (S402: Yes), the CPU 10 in S404 determines the image files classified into the selected category as files to be processed. Meanwhile, when the user touches the print icon after the user has selected one of the icons, the CPU 10 specifies, as files to be printed, all the image files classified into the category corresponding to the selected icon and executes the print processing. After S404, the CPU 10 returns to S100 in FIG. 3 and executes the processing in S100 by comparing, with the reference number, the number of the image files classified into the selected category as the number of the icons.

Here, the processing in S212 in FIG. 5 will be explained, using the image files shown in FIG. 6 as an example. It is assumed that the reference number is "3" in this example. In the example shown in FIG. 6, where the reference number is "3", the CPU 10 makes the positive decision in S210 (S210: Yes). Thus, the CPU 10 then goes to S212. For example, as explained in S122 in FIG. 3, the CPU 10 in S122 divides the number of the groups "5" by the reference number "3" and obtains "2" as the number of combined categories (noted that a fractional portion thereof is rounded up). The obtained number "2" means that two categories are combined to one category. Each two of the categories are combined based on the number of the combined categories "2" in order from the group A as a first group. The CPU 10 combines the category corresponding to the group A into which the image files whose file names are "1"-"3" are classified and the category corresponding to the group B into which the image files whose file names are "4"-"6" are classified, with each other to create a category corresponding to the groups A and B. Likewise, the CPU 10 combines two categories respectively corresponding to the group C and the group D with each other to create one category corresponding to the groups C and D. A category corresponding to the group E with which no categories are to be combined is not changed (left intact). As a result, the image files whose file names are "1"-"6" are classified into the category corresponding to the groups A and B. The image files whose file names are "7"-"11" are classified into the category corresponding to the groups C and D. The image files whose file names are "12"-"14" are classified into the category corresponding to the group E as in the processing in S208. As a result of the combination in S212, the number of the categories becomes three, that is, the number of the categories can be made equal to or less than the reference number (three). After S212, the CPU 10 goes to S400 in FIG. 10.

Further, the processing in S312 in FIG. 7 will be explained, using the image files shown in FIG. 9 as an example. It is assumed that the reference number is "3" in this example. In the example shown in FIG. 9, where the reference number is "3", the CPU 10 makes the positive decision in S310 (S310: Yes). Thus, the CPU 10 then goes to S312. The CPU 10 classifies, into the category corresponding to "DOMESTIC", the image files whose file names are "1"-"6" whose locations specified in S302 are "DOMESTIC". The CPU 10 classifies, into the category corresponding to "OVERSEAS", the image files whose file names are "7"-"17" whose locations specified in S302 are "OVERSEAS". As a result of the classification in S312, the number of the categories becomes two, in other words, the number of the categories becomes equal, to or less than the reference number (three). After S312, the CPU 10 goes to S400 in FIG. 10.

In view of the above, the CPU 10 classifies the plurality of image files into a plurality of primary categories according to the first classification condition including a first element. When the number of the primary categories is greater than the reference number, the CPU 10 classifies the image files into a plurality of secondary categories according to the second classification condition including a second element that is different from the first element and is a superordinate concept of the first element. This first element will be explained with a specific example. For example, the first element is "DAY" of "YEAR, MONTH, AND DAY". In this case, the first classification condition including the first element is "YEAR, MONTH, AND DAY", and categories corresponding thereto are categories each based on "YEAR, MONTH, AND DAY". The second classification condition including the second element is "YEAR AND MONTH" or "YEAR", and categories corresponding thereto are categories each based on "YEAR AND MONTH" or "YEAR". The first element may be "MONTH" of "YEAR AND MONTH". In this case, the first classification condition including the first element is "YEAR AND MONTH", and categories corresponding thereto are categories each based on "YEAR AND MONTH". The second classification condition including the second element is "YEAR", and categories corresponding thereto are categories each based on "YEAR". Further, the first element is "INDIVIDUAL", for example. In this case, the first classification condition including the first element is a specific "PERSON", and categories corresponding thereto are categories each based on the specific "PERSON". The second classification condition including the second element is "PERSONS", i.e., a specific "GROUP", and categories corresponding thereto are categories each based on "PERSONS", i.e., the specific "GROUP". Further, the first element is domestic "PREFECTURE", for example. In this case, the first classification condition including the first element is "PREFECTURE", and categories corresponding thereto are categories each based on "PREFECTURE". The second classification condition including the second element is "REGION IN JAPAN", and categories corresponding thereto are categories each based on "REGION IN JAPAN". The first element is "COUNTRY" in overseas, for example. In this case, the first classification condition including the first element is "COUNTRY", and categories corresponding thereto are categories each based on "COUNTRY". The second classification condition including the second element is "REGION IN OVERSEAS", and categories corresponding thereto are categories each based on "REGION IN OVERSEAS". In view of these examples, the first classification condition including the first element and the categories corresponding thereto and the second classification condition including the second element (different from the first element) and the categories corresponding thereto have a hierarchical relationship. In other words, the second classification condition including the second element and the categories corresponding thereto are superordinate categories of the first classification condition including the first element and the categories corresponding thereto.

<Effects of Present Embodiment>

In the above-described display processing, the image files are classified until the number of the categories into which the image files are classified becomes equal to or less than the reference number (see S112, S116, S120: No, and S122 in FIG. 3, S206, S210: No, and S212 in FIG. 5, and S306, S310: No, and S312 in FIG. 7), and the display 16 displays thereon the operation screen containing the icons respectively representing the categories whose number is equal to or less than the reference number (see S400 in FIG. 10). Thus, the size of each icon displayed on the operation screen is the reference display size that is easy for the user to visually recognize. Further, the user can recognize an object or contents of the processings and operations represented by the icons, for example. Further, the plurality of display criteria such as the date taken (in year, month, and day format), the person taken, and the location taken are set. This makes it possible to classify the image files from various angles. Further, the image files are sequentially classified according to the classification conditions having the hierarchical relationship for each display criterion. Thus, it is possible to classify the image files while changing the categories for the classification of the image files stepwise. Further, since the icons are displayed on the display 16 in the above-described embodiment, it is easy for the user to recognize a transition of the image processing.

<Correspondence>

Each of the MFD 1 and the information processing device 5 is one example of a display processor. Each of the operation screen displayed on the display 16 and a window frame displayed on the display 58 is one example of the operation screen. Each of the processings in S108-S122, S202-S212, and S300-S312 and the CPU 10 is one example of a classifier. The processing in S400 and the CPU 10 is one example of a display controller. Each of the display 16 and the operation portion 18 is one example of a criterion setting portion. Each of the processings in S110-S118, S204-S208, and S304-S312 and the CPU 10 is one example of a classification-condition setting section. Each of the display 16 and the operation portion 18 is one example of a selection portion. Each of the processing in S404, the CPU 10, and the printer portion 22 is one example of a processing portion.

<Modifications>

The above-described effects can be obtained by the following modifications of the above-described embodiment.

In the above-described embodiment, the display processing is executed upon performing the direct printing function, but the display processing may be executed upon performing another function. For example, the display processing may be executed when a series of images corresponding to the respective image files stored in the storage medium 30 are displayed on the display 16 in order (that is, when what is called a slide show is performed). In this alternative configuration, images corresponding to the image files in the specific category are objects to be displayed.

In the above-described embodiment, the image files to be processed by the display processing are the digital photographs taken by the digital camera, but the present invention is not limited to this. For example, image data to be processed by the display processing may be image data created by the scanner portion 24 and an image file created by a predetermined application software stored in the information processing device 5, for example. In this alternative configuration, the CPU 10 obtains creation dates or update dates (in year, month, and day format) of the image files by the scanner portion 24 (see S108 in FIG. 3) and executes the processings in S110, S114, and S118 in FIG. 3 based on these dates. Further, the processings are executed for persons contained in image files obtained by the scanner portion 24 (see S202-S212 in FIG. 5). If the image files obtained by the scanner portion 24 do not contain the GPS information or other similar information, the CPU 10 may not execute the processings in FIG. 7. Various categories may be used as the categories where the display criterion is the location. For example, the classification conditions may be set such that the classification condition 3C is set as "INSIDE/OUTSIDE COMPANY" corresponding to "DOMESTIC/OVERSEAS", the classification condition 33 is set as "MAIN OFFICE INSIDE COMPANY/COMPANY OUTSIDE COMPANY" corresponding to "DOMESTIC REGION/OVERSEAS REGION"), and the classification condition 3A is set as "DEPARTMENT" corresponding to ("DOMESTIC PREFECTURE/OVERSEAS COUNTRY"). In this alternative configuration, information corresponding to the GPS information is such information that represents which department the person is attached to in the company. The classification condition of the display criterion may be other conditions such as a condition having a hierarchical relationship or a parallel relationship. Here, the hierarchical relationship is a relationship in which one classification condition is the same as another classification condition in a basic concept as to the contents of the image files such as the persons contained in the image files or a situation for creating the image files such as the shoot year, month, and day and the location of the image files, and the one and another classification conditions are a superordinate concept and a subordinate (subset) concept in a concrete concept. For example, where the display criterion is the location, "TOHOKU" and "AOMORI" have the same basic concept in the location as "DOMESTIC", but in the concrete concept, "TOHOKU" is a superordinate concept, and "AOMORI" is a subordinate concept of "Tohoku". In the above-described embodiment, the CPU 10 sets a classification condition for the most subordinate concept and then sets a classification condition for a superordinate concept of the most subordinate concept. Further, the parallel relationship is a relationship in which one classification condition is different from another classification condition in the basic concept as to the contents of the image files such as the persons contained in the image files or the situation for creating the image files such as the shoot year, month, and day and the location of the image files. For example, where the display criterion is the location, "AREA WITH SEA", "AREA WITH HOT SPRING", and "AREA WITH MOUNTAIN" does not have the same basic concept in the location.

Where the image files are stored in the storage medium 30, a folder may be created for classifying and organizing the image files. The display processing may be executed for image files stored in a specific folder (e.g., a highest folder). In this alternative configuration, where the specific folder contains a plurality of image files and sub-folders, each of the judgments in S112, S116, and S120 in FIG. 3, S206 and S210 in FIG. 5, and S306 and S310 in FIG. 7 is executed by comparing, with the reference number, a total number of the number of the categories in the display processing and the number of the sub-folders. That is, where the specific folder contains the image files and the sub-folders, each judgment is executed by comparing, with the reference number, the total number of the number of the categories into which the image files are classified in the display processing and the number of the sub-folders. It is noted that, where the user has selected one of icons representing the sub-folders, the display processing may be executed for the sub-folder.

In the above-described embodiment, the CPU 10 judges whether the display criterion is set or not in S104 (in FIG. 3) in the display processing, but the processing in S104 may be omitted. For example, the display processing may be executed where the display criterion has been set. In this case, the processing in S104 is omitted, and when the CPU 10 makes the positive decision in S100 (S100: Yes), the CPU 10 goes to S106.

The display processing may be executed by the information processing device 5. In this alternative configuration, a computer program for the display processing is installed in the HDD 54, and the location information list shown in FIG. 8 is stored in the HDD 54. Where the computer program, etc., for the display processing are stored in the HDD 54, the CPU 50 executes the computer program for the display processing on the RAM 56. As a result, the information processing device 5 constitutes various functional sections for the display processing. As in the MFD 1, the operation screen (see FIG. 11A-11C) containing the icons is displayed in the information processing device 5. However, since the window frame as the operation screen may be variable in the information processing device 5, the reference number of the icons contained in the operation screen may be changed to the reference number determined by a size of the window frame and the reference display size of each icon displayed within the window frame, each time when the size of the window frame is changed. The reference number is set as a number determined by a display area of the display 58 or the size of the window frame displayed on the display area and the predetermined reference display size. Where the display processing is executed by the information processing device 5, the processing may be executed for the image files stored in the storage medium 30 of the MFD 1 and may be executed for the image files stored in the information processing device 5.

Where the shoot date is set as the display criterion in FIG. 2 in the above-described embodiment, the CPU 10 executes the processings in S108-S120 in FIG. 3. However, when the CPU 10 judges in S120 that the number of the categories is greater than the reference number, the CPU 10 may execute the processings in S202-S210 in FIG. 5. Then, when the CPU 10 judges in S210 that the number of the categories is greater than the reference number, the CPU 10 may execute the processings in S300-S312 in FIG. 7.

It is noted that, as described above, each of the classification conditions 1A, 1B, 1C whose respective conditions are "YEAR, MONTH, AND DAY", "YEAR AND MONTH", and "YEAR" in or on which the image files are taken, and the classification conditions 2A, 2B, 2C whose respective conditions are "DOMESTIC PREFECTURE AND OVERSEAS COUNTRY", "DOMESTIC REGION AND OVERSEAS REGION", and "DOMESTIC/OVERSEAS" in which the image files are taken is a classification condition related to a creation situation of the image files. The classification condition related to the creation situation of the image files includes: a model of a device having created the image file (e.g., a name of a camera or a scanner); a shoot (taking) condition of the image file (e.g., an aperture, an exposure, and an ISO speed); and the number of pixels of the image file, and the CPU 10 may use these classification conditions to classify the image files. Further, the classification conditions 2A, 2B whose conditions are the persons and the group of the image file is a classification condition related to the contents (properties) of the image file. The classification condition related to the contents of the image file includes: a subject in the image file (e.g., a person, a building, and a scenery); and the number of the persons in the image file, and the CPU 10 may use these classification conditions to classify the image files.

What is claimed is:
1. A method of display processing to be executed in a display processor for controlling a display to display thereon an operation screen on which a plurality of icons are arranged, the method comprising:
- judging whether the number of a plurality of image files stored in a storage medium accessible by the controller is greater than a maximum-displaying number that is the number of the plurality of icons, respectively corresponding to the plurality of image files, arrangeable on the operation screen and that is determined based on a size of the operation screen and a size of the plurality of icons;
- controlling the display to display thereon an icon-operation screen on which are arranged all of the plurality of icons when it is judged that the number of the plurality of image files is equal to or less than the maximum-displaying number, all of the plurality of icons being arranged on the icon-operation screen such that all of the plurality of icons do not overlay with each other;
- classifying the plurality of image files into a plurality of primary categories by a first classification condition in which the plurality of image files are categorized based on respective shoot dates when it is judged that the number of the plurality of image files is greater than the maximum-displaying number;
- judging whether the number of the plurality of primary categories is greater than the maximum-displaying number, that is the number of a plurality of primary-categorizing icons arrangeable on the operation screen and that is determined based on a size of the operation screen and a size of the plurality of primary-categorized icons;
- controlling the display to display thereon a first operation screen as the operation screen on which are arranged all of the plurality of primary-categorizing icons respectively representing the plurality of categories when it is judged that the number of the plurality of primary categories is equal to or less than the maximum-displaying number, all of the plurality of primary-categorizing icons being arranged on the first operation screen such that all of the plurality of primary-categorizing icons do not overlap with each other;
- classifying the plurality of image files into a plurality of secondary categories by a second classification condition in which the plurality of image files are categorized based on respective shoot months when it is judged that the number of the plurality of primary categories is greater than the maximum-displaying number;
- judging whether the number of the plurality of secondary categories is greater than the maximum-displaying number, that is the number of a plurality of secondary-categorizing icons arrangeable on the operation screen and that is determined based on the size of the operation screen and a size of the plurality of secondary-categorized icons;
- controlling the display to display thereon a second operation screen as the operation screen on which are arranged the plurality of secondary-categorizing icons respectively representing the plurality of secondary categories when it is judged in the second judging processing that the number of the plurality of secondary categories is equal to or less than the maximum-displaying number, all of the plurality of secondary-categorizing icons being arranged on the second operation screen such that all of the plurality of secondary-categorizing icons do not overlap with each other;
- classifying the plurality of image files into a plurality of tertiary categories by a third classification condition in which the plurality of image files are categorized based on respective shoot years when it is judged that the number of the plurality of secondary categories is greater than the maximum-displaying number;
- judging whether the number of the plurality of tertiary categories is greater than the maximum-displaying number, that is the number of a plurality of tertiary-categorizing icons arrangeable on the operation screen and that is determined based on the size of the operation screen and a size of the plurality of secondary-categorized icons;
- controlling the display to display thereon a third operation screen as the operation screen on which are arranged all of the plurality of tertiary-categorizing icons respectively representing the plurality of tertiary categories when it is judged that the number of the plurality of tertiary categories is equal to or less than the maximum-displaying number, all of the plurality of tertiary-categorizing icons being arranged on the third operation screen such that all of the plurality of tertiary-categorized icons do not overlap with each other;
- generating a plurality of combined categories by combining the plurality of tertiary categories such that the number of the plurality of combined-categorized icons, respectively representing the plurality of combined categories, becomes equal to or less than the maximum-displaying number, that is the number of the plurality of combined-categorized icons and that is determined based on the size of the operation screen and size of the plurality of combined-categorized icons, and classifying the plurality of image files into the plurality of combined categories, when it is judged that the number of the plurality of tertiary categories is greater than the maximum-displaying number; and
- controlling the display to display thereon a fourth operation screen as the operation screen on which are arranged all of the plurality of combined-categorized icons do not overlap with each other.

2. A display processing apparatus for controlling a display to display thereon an operation screen on which a plurality of icons are arranged, the display processing apparatus comprising a controller, the controller being configured to perform:
- a file-judging processing configured to judge whether the number of a plurality of image files stored in a storage medium accessible by the controller is greater than a maximum-displaying number that is the number of the plurality of icons, respectively corresponding to the plurality of image files, arrangeable on the operation screen and that is determined based on a size of the operation screen and a size of the plurality of icons;
- an icon-display processing configured to control the display to display thereon an icon-operation screen on which are arranged all of the plurality of icons when it is judged in the file-judging processing that the number of the plurality of image files is equal to or less than the maximum-displaying number, all of the plurality of icons being arranged on the icon-operation screen such that all of the plurality of icons do not overlay with each other;
- a first classification processing configured to classify the plurality of image files into a plurality of primary categories by a first classification condition in which the plurality of image files are categorized based on respective shoot dates when it is judged in the file-judging processing that the number of the plurality of image files is greater than the maximum-displaying number;

a first judging processing configured to judge whether the number of the plurality of primary categories is greater than the maximum-displaying number, that is the number of a plurality of primary-categorized icons arrangeable on the operation screen and that is determined based on a size of the operation screen and a size of the plurality of primary-categorized icons;

a first display processing configured to control the display to display thereon a first operation screen as the operation screen on which are arranged all of the plurality of primary-categorizing icons respectively representing the plurality of primary categories when it is judged in the first judging processing that the number of the plurality of primary categories is equal to or less than the maximum-displaying number, all of the plurality of primary-categorizing icons being arranged on the first operation screen such that all of the plurality of primary-categorizing icons do not overlap with each other;

a second classification processing configured to classify the plurality of image files into a plurality of secondary categories by a second classification condition in which the plurality of image files are categorized based on respective shoot months when it is judged in the first judging processing that the number of the plurality of primary categories is greater than the maximum-displaying number;

a second judging processing configured to judge whether the number of the plurality of secondary categories is greater than the maximum-displaying number, that is the number of a plurality of secondary-categorizing icons arrangeable on the operation screen and that is determined based on the size of the operation screen and a size of the plurality of secondary-categorized icons;

a second display processing configured to control the display to display thereon a second operation screen as the operation screen on which are arranged all of the plurality of secondary-categorizing icons respectively representing the plurality of secondary categories when it is judged in the second judging processing that the number of the plurality of secondary categories is equal to or less than the maximum-displaying number, all of the plurality of secondary-categorizing icons being arranged on the second operation screen such that all of the plurality of secondary-categorizing icons do not overlap with each other;

a third classification processing configured to classify the plurality of image files into a plurality of tertiary categories by a third classification condition in which the plurality of image files are categorized based on respective shoot years when it is judged that in the first judging processing that the number of the plurality of secondary categories is greater than the maximum-displaying number;

a third judging processing configured to judge whether the number of the plurality of tertiary categories is greater than the maximum-displaying number, that is the number of a plurality of tertiary-categorizing icons arrangeable on the operation screen and that is determined based on the size of the operation screen and a size of the plurality of secondary-categorized icons;

a third display processing configured to control the display to display thereon a third operation screen as the operation screen on which are arranged all of the plurality of tertiary-categorizing icons respectively representing the plurality of tertiary categories when it is judged in the third judging processing that the number of the plurality of tertiary categories is equal to or less than the maximum-displaying number, all of the plurality of tertiary-categorizing icons being arranged on the third operation screen such that all of the plurality of tertiary-categorized icons do not overlap with each other;

a combining processing configured to generate a plurality of combined categories by combining the plurality of tertiary categories such that the number of the plurality of combined-categorized icons, respectively representing the plurality of combined categories, becomes equal to or less than the maximum-displaying number, that is the number of the plurality of combined-categorized icons and that is determined based on the size of the operation screen and a size of the plurality of combined-categorized icons, and configured to classify the plurality of image files into the plurality of combined categories, when it is judged in the third judging processing that the number of the plurality of tertiary categories is greater than the maximum-displaying number; and a fourth display processing configured to control the display to display thereon a fourth operation screen as the operation screen on which are arranged all of the plurality of combined-categorized icons do not overlap with each other.

3. The display processor according to claim 2, the controller is further configured to perform:

a selection processing configured to select a specific icon of the plurality of icons displayed on the operation screen; and an execution processing configured to execute an image processing for at least one image file classified into a category represented by the specific icon selected by the selection portion, wherein the controller is configured to control the display to display thereon the operation screen on which are arranged an icon representing the image processing and the plurality of icons respectively representing the plurality of categories whose number is equal to or less than the maximum-displaying number.

4. A nontransitory storage medium storing a program to be executed by a computer of a display processing apparatus for controlling a display to display thereon an operation screen on which a plurality of icons are arranged, the program being designed to cause the computer to perform:

a file-judging processing configured to judge whether the number of a plurality of image files stored in a storage medium accessible by the controller is greater than a maximum-displaying number that is the number of the plurality of icons, respectively corresponding to the plurality of image files, arrangeable on the operation screen and that is determined based on a size of the operation screen and a size of the plurality of icons;

an icon-display processing configured to control the display to display thereon an icon-operation screen on which are arranged all of the plurality of icons when it is judged in the file-judging processing that the number of the plurality of image files is equal to or less than the maximum-displaying number, all of the plurality of icons being arranged on the icon-operation screen such that all of the plurality of icons do not overlay with each other;

a first classification processing configured to classify the plurality of image files into a plurality of primary categories by a first classification condition in which the plurality of image files are categorized based on respective shoot dates when it is judged in the file-judging processing that the number of the plurality of image files is greater than the maximum-displaying number;

a first judging processing configured to judge whether the number of the plurality of primary categories is greater than the maximum-displaying number, that is the number of a plurality of primary-categorized icons arrangeable on the operation screen and that is determined based on a size of the operation screen and a size of the plurality of primary-categorized icons;

a first display processing configured to control the display to display thereon a first operation screen as the operation screen on which are arranged all of the plurality of primary-categorizing icons respectively representing the plurality of primary categories when it is judged in the first judging processing that the number of the plurality of primary categories is equal to or less than the maximum-displaying number, all of the plurality of primary-categorizing icons being arranged on the first operation screen such that all of the plurality of primary-categorizing icons do not overlap with each other;

a second classification processing configured to classify the plurality of image files into a plurality of secondary categories by a second classification condition in which the plurality of image files are categorized based on respective shoot months when it is judged in the first judging processing that the number of the plurality of primary categories is greater than the maximum-displaying number;

a second judging processing configured to judge whether the number of the plurality of secondary categories is greater than the maximum-displaying number, that is the number of a plurality of secondary-categorizing icons arrangeable on the operation screen and that is determined based on the size of the operation screen and a size of the plurality of secondary-categorized icons;

a second display processing configured to control the display to display thereon a second operation screen as the operation screen on which are arranged all of the plurality of secondary-categorizing icons respectively representing the plurality of secondary categories when it is judged in the second judging processing that the number of the plurality of secondary categories is equal to or less than the maximum-displaying number, all of the plurality of secondary-categorizing icons being arranged on the second operation screen such that all of the plurality of secondary-categorizing icons do not overlap with each other;

a third classification processing configured to classify the plurality of image files into a plurality of tertiary categories by a third classification condition in which the plurality of image files are categorized based on respective shoot years when it is judged that in the first judging processing that the number of the plurality of secondary categories is greater than the maximum-displaying number;

a third judging processing configured to judge whether the number of the plurality of tertiary categories is greater than the maximum-displaying number, that is the number of a plurality of tertiary-categorizing icons arrangeable on the operation screen and that is determined based on the size of the operation screen and a size of the plurality of secondary-categorized icons;

a third display processing configured to control the display to display thereon a third operation screen as the operation screen on which are arranged all of the plurality of tertiary-categorizing icons respectively representing the plurality of tertiary categories when it is judged in the third judging processing that the number of the plurality of tertiary categories is equal to or less than the maximum-displaying number, all of the plurality of tertiary-categorizing icons being arranged on the third operation screen such that all of the plurality of tertiary-categorized icons do not overlap with each other;

a combining processing configured to generate a plurality of combined categories by combining the plurality of tertiary categories such that the number of the plurality of combined-categorized icons, respectively representing the plurality of combined categories, becomes equal to or less than the maximum-displaying number; that is the number of the plurality of combined-categorized icons and that is determined based on the size of the operation screen and a size of the plurality of combined-categorized icons, and configured to classify the plurality of image files into the plurality of combined categories, when it is judged in the third judging processing that the number of the plurality of tertiary categories is greater than the maximum-displaying number; and a fourth display processing configured to control the display to display thereon a fourth operation screen as the operation screen on which are arranged all of the plurality of combined-categorized icons do not overlap with each other.

* * * * *